Figure 1:
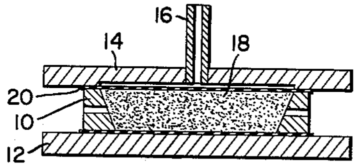

Aug. 24, 1965 J. B. PETTERSSON ETAL 3,202,501

ANTICAKING AGENTS

Filed March 12, 1963

INVENTORS
JOHAN BIRGER PETTERSSON
OLA AKSENS
TORE NATVIG JACOBSEN
LEIF HAMMER
BY
ATTORNEY

United States Patent Office 3,202,501

Patented Aug. 24, 1965

3,202,501
ANTICAKING AGENTS
Johan Birger Pettersson, Ola Aksens, Tore Natvig Jacobsen, and Leif Hammer, Ljungaverk, Sweden, assignors to Stockholms Superfosfat-Fabriks Aktiebolag, Stockholm, Sweden, a company of Sweden
Filed Mar. 12, 1963, Ser. No. 264,725
8 Claims. (Cl. 71—28)

This invention generally relates to the discovery of novel anticaking agents for use in connection with finely divided material such as ammonium nitrate, urea and nitrogenous fertilizers.

BACKGROUND

Numerous finely divided and coarse solid industrial products have a troublesome tendency to cake or "set" during storage due to agglomeration of the particles. This makes such products difficult to handle. This tendency is particularly pronounced in the case of water soluble and hygroscopic products. Among the inorganic compounds exhibiting this undesirable property could be listed the inorganic nitrates, particularly ammonium nitrate, and nitrogenous fertilizers in general. Among the organic compounds having this undesirable property could be listed urea and products containing urea. When ammonium nitrate is stored in stacked bags the contents will cake to lumps after a short time. These cakes and lumps are difficult to crush and the nitrate often has to be ground and sieved prior to use for various purposes such as the preparation of explosives.

In the past attempts have been made to overcome this disadvantage and to obtain a free-flowing product by means of various additions of so-called anticaking agents. For instance, attempts have been made to eliminate the above problems by treating the surface of the particles with agents which will either reduce the moisture uptake and/or mechanically prevent intimate contact of the particles.

More recent attempts have involved the addition of water-soluble surface active agents in order to decrease the surface tension of water and thus distribute any moisture evenly over the surface of the particles. The theory behind this is that the amount of water which would gather at the contact points of the particles by capillary force is reduced and likewise the formation of crystal bridges.

The use of other organic compounds have been proposed which will reduce the strength of any crystal bridges formed between the particles so that caking becomes less serious. Such compounds usually belong to the class of sulphonated aromatic dyestuffs and are soluble in a saturated ammonium nitrate solution.

It has also been proposed to treat urea with nitrogenous organic compounds such as p-toluidine and p-anisidine and with alkyl amines such as octadecyl amine. This treatment apparently results in the formation of a substituted urea on the surface of the urea particles by reaction with the additives mentioned.

It is also known to let the melt from the urea synthesis drop into oil, whereby one might expect an urea/hydrocarbon complex to form on the surface of the urea particles, thus imparting improved storage properties to the product. However, this surface coating has a very poor abrasive strength and as soon as it becomes loosened the anticaking effect is markedly decreased.

Figure 2:
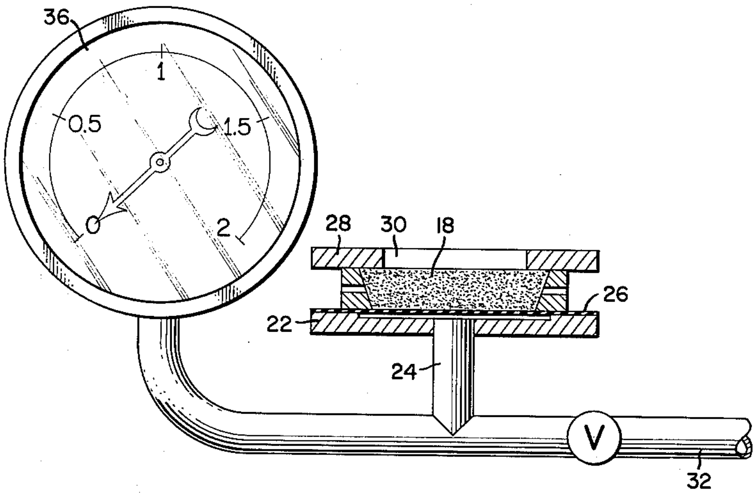

FIGURES 1 and 2 are cross sectional views of apparatus useful in making comparative tests as to fracturing strength.

THE PRESENT INVENTION

We have found that certain nitrogenous heterocyclic ring compounds having one or more hydrophobic groups attached to the ring are excellent anticaking agents. More particularly, our novel anticaking agents can be characterized by the following formula:

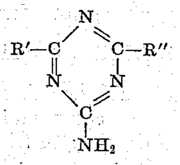

wherein

R'=R, NHCOR or NHR
R''=R, NHCOR, NHR, $NH_2$, OH or COOR
R=an alkyl group having 8–20 carbon atoms.

The present invention also contemplates the use of condensation products of compounds of the above formula.

According to current chemical nomenclature the compounds contemplated by the present invention correspond to the above structural formula. The $NH_2$— group however is a part of an amidine-grouping (—NHC—($NH_2$)=NH—)

of the s-triazine system and it is known that this grouping undergoes a tautomeric conversion to a structure comprising an imine-group =NH(—NHC(=NH)—NH—). A structure having an imine group attached to the triazine ring instead of an amine group better describes the chemical and physical properties of our novel anticaking agents, which is both apparent from the fact they do not form stable salts with strong inorganic and organic acids and also from spectrographic data. According to the present invention the novel anticaking agents contemplated thus include those comprising an amine group or an imine group attached to the triazine ring.

It has been found that of the compounds having the above formula those which have a particularly remarkable anticaking effect are those wherein one of the substituents on the s-triazine ring, in addition to one or two hydrophobic groups, is an amino group (—$NH_2$) or an imine group (—NH—). An especially good anticaking effect is obtained if in addition there is a polar substituent such as a hydroxy group (—OH) or a substituted amide group (—NHCOR) attached to the triazine ring. The hydrophobic group preferably is an alkyl group having 8–20 carbon atoms such as a dodecyl, a hexadecyl or an octadecyl group. The alkyl group may be directly attached to a carbon atom in the triazine ring or via an amide group (—NHCO—), an imine group (—NH—) or an ester group (—COO—).

As examples of particularly effective and preferred anticaking agents may be mentioned:

2-hydroxy-4-amino-6-undecyl-s-triazine
2-hydroxy,4-amino-6-heptadecyl-s-triazine
2-amino-4-stearoylamino-6-heptadecyl-s-triazine, and
2-hydroxy-4-amino-6-octadecylamino-s-triazine.

The anticaking agents according to the present invention are solid hydrophobic substances almost insoluble in water. Due to their polar end-groups the agents are adsorbed and attached to the surface of carrier particles, with the hydrophobic groups turned outwardly so as to cause a permanent hydrophobation of the treated, pulverulent or granulated (prilled) product.

In order to facilitate the even distribution of the anticaking agent on the product while using only a minimum amount, the agents should preferably be applied in a finely divided form. The application can be easily carried out in a mixer, preferably at an elevated temperature, e.g. 60–80° C. To obtain a satisfactory anticaking effect and a free-flowing product addition of from 0.1 percent by weight to about 0.01 percent by weight based on the amount of the product may be used. Preferred amounts are from 0.05 to 0.1 percent by weight.

The anticaking agents of the type mentioned have shown excellent anticaking properties in the treatment of ammonium nitrate, nitrogenous fertilizers and urea.

OTHER ADDITIVES

It also has been established that the anti-caking effect of the above triazine compounds, particularly of 2-hydroxy-4-amino-6-heptadecyl-s-triazine and 2-amino-4-stearoylamino-6-heptadecyl-s-triazine can be increased by the addition of a pulverulent urea-aldehyde-condensation product, particularly an urea-formaldehyde resin. Treatment with an urea-resin *alone* shows only an insignificant effect. The synergetic (additive) effect may be due to the affinity of the resin to both the product to be treated and to the triazine compound and possibly a chemical reaction with both of them. In this manner the abrasive strength of the surface coating is improved by the urea resin addition. The additive effect is particularly notable in treating ammonium nitrate and urea.

Also the addition of a hydrocarbon improves the anticaking effect of our specified triazine compounds. A combined treatment with a triazine compound, an urea-aldehyde resin, and a hydrocarbon results in a further and remarkable improvement of the anti-caking effect particularly when treating urea, apparently due to an improvement in the thickness and abrasive strength of the surface coating. The treatment with hydrocarbons should be carried out at room temperature because inclusion complexes of urea and aliphatic (paraffinic) unbranched hydrocarbons dissociate at about 60° C. Aromatic or branched hydrocarbons are unable to form complexes with urea and hence do not result in any worthwhile improvement.

THE EXAMPLES

The invention will be further illustrated by the following examples which show some specific anticaking agents useful in accordance with the invention. All percentages in the examples are by weight and calculated on the product treated. It will be understood that the examples are not to be considered as limiting in any way.

The conventional method for determining the anticaking effect of various agents is by the penetrometrical measurement on compressed specimens of the treated product. This method is not applicable when testing and differentiating the agents of the present invention because the present agents have such a favorable anticaking effect that the penetrometer needle will penetrate such compresesd test specimens upon the application of only a very small pressure.

In order to adequately compare and evaluate the various anticaking agents we have found it necessary to employ a much more sensitive test. This test essentially involves measuring the pressure required for fracturing flat test specimens of the compressed and conditioned product. Samples of untreated or treated product are introduced into a ring having a diameter of 88 mm. and a height of 20 mm. and conditioned for 2 days over a saturated water solution of the product to be treated. A compression force of 0.6 to 1 kg./cm.$^2$ was then applied for 2 to 4 days. The test specimens thus obtained were subjected to an increasing pressure applied to the base surface and the pressure required to fracture the specimens was recorded. In the following examples a dimensionless anticaking factor is indicated representing the pressure required for fracturing an untreated test specimen divided by the corresponding pressure for the treated test specimen. A higher anticaking factor indicates a superior anticaking effect in comparison with a lower anticaking factor. Presenting the test results in terms of the anticaking factor allows a direct comparison between the various anticaking agents in the test series.

More specifically, in order to evaluate the anticaking agents the following test method was employed:

500 g. of the product to be treated was heated in a rotating mixer to 90° C., then allowed to cool to 80° C. at which temperature the test amount of anticaking agent was slowly added. The sample was then allowed to cool to about room temperature under continued mixing. In the special case of urea the amount of oil was added at a temperature of 35–40° C., and the mixing was continued for about 10 minutes.

*Example 1*

Crystallized ammonium nitrate was poured into a mixer and heated to 90° C., and this temperature was maintained for 5 minutes. The charge was permitted to cool to 65° C., separated into a plurality of smaller samples and then each of the chemical compounds identified below were admixed with a sample in an amount corresponding to .1% by weight calculated on the basis of amount of ammonium nitrate. After such addition the mixing was continued for 20 minutes to insure uniform dispersion. Test specimens were prepared from the treated ammonium nitrates samples and conditioned as described above and then the fracture pressure was determined. The anticaking factor was also calculated.

| Amm nium nitrate | Fracture pressure, kg./cm.$^2$ | Anticaking factor |
|---|---|---|
| Untreated | 1.2–1.7 | ---------- |
| Treated with: | | |
| 2-hydroxy-4-amino-6-undecyl-s-triazine | 0.3 | 4.0 |
| 2-amino-4-stearoylamino-6-heptadecyl-s-triazine | 0.15 | 8.0 |
| 2-hydroxy-4-amino-6-heptadecyl-s-triazine | 0.08 | 15.0 |
| 2-hydroxy-4-amino-6-octadecylamino-s-triazine | 0.23 | 5.2 |
| Technical mixtures comprising 10–20% of one of the last-mentioned compounds and 75% stearic acid and stearoylamide | 0.10–0.15 | 12.0–8.0 |
| $N^2$,$N^4$-didodecyolmelamine | 0.35 | 3.4 |
| $N^2$,$N^4$-dictadecylmelamine | 0.36 | 3.3 |
| 2-hydroxy-4-amino-6-octadecylamino-s-trizine | 0.45 | 2.7 |
| 2-octadecyloxy-4-amino-6-octadecylamino-s-triazine | 0.28 | 4.3 |

*Example 2*

Test specimens were prepared from crystallized ammonium nitrate according to the procedure of Example 1 employing as the anticaking agent a technical compound comprising 10–20% of 2-hydroxy-4-amino-6-heptadecyl-s-triazine and 75% of stearic acid and stearoyl amide and four different brands of hydrocarbon oils were added, The amount of the anticaking agent was varied between .025% and 0.1% by weight of the nitrate. The fracture pressure was determined as mentioned above and the anticaking factor was calculated.

| Ammonium nitrate | Fracture pressure, kg./cm.² | Anticaking factor |
|---|---|---|
| Untreated | 1.2–1.7 | ---------- |
| Treated with: | | |
| .1% of above triazine compound | 0.15 | 8.0 |
| .025% of above triazine compound + .075% paraffin oil | 0.18 | 6.7 |
| 0.50% of above triazine compound+0.50% paraffin oil | 0.15 | 8.0 |
| .075% of above triazine compound+0.25 paraffin oil | 0.20 | 6.0 |
| 0.25% of above triazine compound+0.75% spinesso 34 | 0.23 | 5.2 |
| 0.50% of above triazine compound+0.50% spinesso 34 | 0.30 | 4.0 |
| 0.75% of above triazine compound+0.25% spinesso 34 | 0.30 | 4.0 |
| 0.25% of above triazine compound+0.75% univolt 35 | 0.25 | 4.8 |
| 0.50% of above triazine compound+0.50% univolt 35 | 0.30 | 4.0 |
| 0.75% of above triazine compound+0.25% univolt 35 | 0.32 | 3.7 |
| 0.25% of above triazine compound+0.75% coray 40 | 0.25 | 4.8 |
| 0.50% of above triazine compound+0.50% coray 40 | 0.23 | 5.2 |
| 0.75% of above triazine compound+0.25% coray 40 | 0.25 | 4.8 |
| 0.1% paraffin oil | 1.4 | 0.8 |

From the above tests it is apparent that the anticaking agents of this invention can be admixed with considerable amounts of hydrocarbon oils without essentially decreasing the anticaking effect.

*Example 3*

Prilled urea was poured in a mixer and heated to 80° C under agitation. When the temperature had dropped to about 60° C. an amount of 0.05% of 2-amino-4-stearoyl-amino-6-heptadecyl-s-triazine was added and the agitation continued for about 5 minutes. One half of this mixture was admixed with 0.05% of an urea-formaldehyde resin in pulverous form. The samples were conditioned for 2 days over a saturated aqueous solution of urea and were then subjected to a pressure of 0.6 kg./cm.². The fracture pressure was determined and the anticaking factor was calculated. The figures in the table below are average figures for two specimens:

| | Anticaking factor |
|---|---|
| Untreated | 1.0 |
| 0.05% triazine compound | 3.2 |
| 0.05% triazine compound+0.05% urea resin | 5.2 |
| 0.05% urea resin | 1.3 |

This investigation showed that the addition of the urea resin resulted in a profound improvement of the anticaking effect of the triazine compound.

*Example 4*

Crystallized urea was poured into a mixer and heated to 80° C. under agitation. When the temperature had dropped to about 60° C. a mixture of various amounts of 2-amino-4-stearoyl-amino-6-heptadecy-s-triazine and urea-formaldehyde resin was added under agitation. The agitation was continued for about 5 minutes. After cooling the samples were admixed with various amounts of three different types of oils. The specimens were conditioned for 2 days over a saturated aqueous solution of urea and were adjusted to a pressure of 0.6 kg./cm.² for 4 days. The fracture pressure was determined and the anticaking factor calculated. The figures in the table are average figures from two specimens. For comparison the anticaking factor 11 for urea treated with 0.1% of triazine compound and 0.05% of urea resin is given.

| | Anticaking factor | | |
|---|---|---|---|
| | Dieseltax (N-alkane) | Naptha (cyclic) | Propylene-tetramer (branched) |
| 0.05% triazine compound+0.05% urea resin+0.05% oil | 23 | 4.1 | 2.0 |
| 0.01% triazine compound+0.05% urea resin+0.09% oil | 35 | 1.2 | 1.2 |
| 0.1% oil | 2.5 | 1.2 | 0.9 |

The above investigation shows that the addition of an aliphatic (paraffinic) oil results in a considerable increase of the anticaking effect. On the contrary, the addition of a cyclical or branched oil will reduce the effect.

*Example 5*

Urea was treated with 0.01% of 2-amino-4-stearoyl-amino-6-heptadecyl-s-triazine and thereafter in the same mixer with 0.1% of diesel oil, sample A. The mixing was continued for 90 minutes. At certain intervals small samples were taken out and the anticaking effect was determined. Another amount of urea was treated with 0.01% of the same triazine compound, 0.01% of urea-formaldehyde resin and 0.1% of diesel oil, sample B. The mixing was continued and small samples taken out as described before. The following figures were recorded:

| | Anticaking factor | |
|---|---|---|
| | Sample A | Sample B |
| Mixing for 10 minutes | 3.5 | 7.3 |
| Mixing for 20 minutes | 3.1 | 7.2 |
| Mixing for 40 minutes | 2.7 | 7.3 |
| Mixing for 60 minutes | 2.1 | 6.8 |
| Mixing for 90 minutes | 1.9 | 6.5 |

The above investigation shows that the addition of the urea resin results in a producing particularly good abrasion resistance of the anticaking coating.

More or less detailed claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents for the materials specifically recited in the claims. We intend that all such obvious equivalents be encompassed within the scope of this invention and patent grant in accordance with the well-known doctrine of equivalents, as well as changed proportions of the ingredients which do not render the composition unsuitable for the disclosed purposes.

What is claimed is:

1. A novel composition comprising an admixture of a predominant amount of a pulverulent material consisting of discrete particles which normally has a tendency to cake, said discrete particles being coated with a very small amount of an anticaking agent characterized by the formula:

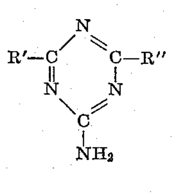

wherein:

$R_1$ is selected from the group consisting of R, NHCOR and NHR;

R″ is selected from the group consisting of R, NHCOR, NHR, $NH_2$, OH and COOR;

R is an alkyl group having 8–20 carbon atoms.

2. A composition according to claim 1 which additionally contains stearic acid.

3. A composition according to claim 1 which additionally contains stearylamide.

4. A composition according to claim 1 wherein said pulverulent material is a nitrogenous fertilizer selected from the group consisting of ammonium-calcium nitrate fertilizers and fertilizers containing nitrogen, phosphorus and potassium.

5. A novel composition comprising an admixture of a predominant amount of a pulverulent material consisting of discrete particles selected from the group consisting of ammonium nitrate, urea and nitrogenous fertilizers which normally have a tendency to cake, said discrete particles being coated with a very small amount of 2-hydroxy-4-amino-6-undecyl-s-triazine as an anti-caking agent.

6. A composition according to claim 5 wherein said anti-caking agent is 2-hydroxy-4-amino-6-heptadecyl-s-triazine.

7. A composition according to claim 5 wherein said anti-caking agent is 2 - amino - 4 - stearoylamino-6-heptadecyl-s-triazine.

8. A composition according to claim 5 wherein said anti-caking agent is 2-hydroxy-4-amino-6-octadecylamino-s-triazine.

References Cited by the Examiner

UNITED STATES PATENTS

| | | | |
|---|---|---|---|
| 2,321,052 | 6/43 | Thurston | 260—249.9 |
| 2,418,944 | 4/47 | Kaiser et al. | 260—249.9 |
| 2,437,691 | 3/48 | Grun | 260—249.9 |
| 2,945,322 | 7/60 | Gaeth et al. | 71—28 |
| 3,014,783 | 12/61 | Young | 71—64 |
| 3,024,098 | 3/62 | Austin et al. | 71—64 |
| 3,085,870 | 4/63 | Bradford et al. | 71—64 |

DONALL H. SYLVESTER, *Primary Examiner.*

ANTHONY SCIAMANNA, *Examiner.*